United States Patent [19]

Cappon

[11] 3,906,461

[45] Sept. 16, 1975

[54] INTEGRATED MNOS MEMORY WITH DECODER

[75] Inventor: Arthur M. Cappon, Boston, Mass.

[73] Assignee: Sperry Rand Corporation, New York, N.Y.

[22] Filed: Mar. 29, 1974

[21] Appl. No.: 456,091

[52] U.S. Cl. .............................. 340/172.5; 340/173

[51] Int. Cl.² .............................. G11C 11/40

[58] Field of Search .... 340/173 VT, 173 AD, 172.5

[56] References Cited

UNITED STATES PATENTS

| | | | |
|---|---|---|---|
| 3,579,204 | 5/1971 | Lincoln | 340/173 VT |
| 3,719,932 | 3/1973 | Cappon | 340/173 VT |
| 3,771,148 | 11/1973 | Aneshansley | 340/173 VT |

*Primary Examiner*—Vincent P. Canney

*Attorney, Agent, or Firm*—Howard P. Terry; Joseph M. Roehl

[57] ABSTRACT

A digital memory system employing a rectangular array of known MNOS variable threshold insulated gate field effect transistor memory cells is actuated by auxiliary circuits which provide a four-phase operating sequence. The memory cells are arranged in word rows in which the gate electrodes of all memory cells in a given row are connected together and in bit columns having common source and common drain connections. Individual memory cells are selected by means of word-line and bit-column decoders. Each decoder includes a NOR gate matrix for selecting a given word row or bit column and a dual transistor network which superposes static and dynamic voltages on the output line of the decoder so as to increase speed and stability. The wordline decoder operates through a buffer circuit which performs code inversion and clamps all non-addressed word lines to substrate potential during switching transients. During the four-phase operating sequence, information in each memory cell in an addressed word line is read into a bit storage register wherein individual flip-flops are switched in accordance with the value of the particular bit of information. While information is temporarily stored in the bit register, each addressed memory cell is preset to a large negative threshold level and then cleared so as to be capable of retreiving information from the bit storage register during the fourth phase of the operating sequence. An input/output circuit provides means for updating the information in the bit storage register during the time that the information is temporarily stored therein or of supplying the temporarily stored information to external circuitry.

9 Claims, 3 Drawing Figures

INTEGRATED MNOS MEMORY WITH DECODER

The invention herein described was made in the course of or under a contract, or subcontract thereunder, with the United States Government.

BACKGROUND OF THE INVENTION

1. Field of the Invention

The invention relates to computer memory circuits and more specifically to computer memory circuits employing variable threshold insulated gate field effect transistors as memory cells.

2. Description of the Prior Art

U.S. Pat. No. 3,508,211 entitled, "Electrically Alterable Non-Destructive Readout Field Effect Transistor Memory" and U.S. Pat. No. 3,590,337 entitled, "Plural Dielectric Layered Electrically Alterable Non-Destructive Readout Memory Element," issued to H. A. R. Wegener and assigned to the present assignee, relate to varieties of variable threshold transistors useful as memory elements. Each element is comprised of a variable threshold insulated gate field effect transistor whose conduction threshold is electrically alterable by impressing a voltage between the gate electrode and the substrate in excess of a predetermined finite magnitude. The polarity of the voltage determines the sense in which the threshold is varied. Upon the application to the gate electrode of a fixed interrogation voltage having a value intermediate to two conduction thresholds, the binary condition of the transistor can be sensed by monitoring the magnitude of the resultant source-drain current. The magnitude of the interrogation voltage is insufficient to change the preexisting conduction threshold so that non-destructive readout is achieved.

Several memory circuits employed such variable threshold field effect transistors have been devised. Among these circuits is a circuit employing a four-phase operating sequence described in co-pending patent application Ser. No. 380,372 filed in the name of H. A. R. Wegener on July 19, 1973, and assigned to the present assignee. As described in that patent application, the four-phase operating sequence includes a load phase wherein information stored in the memory cells is written into a bit storage register, preset and clear phases wherein all memory cells in an addressed word row are prepared for the reception of fresh information, and a store phase wherein the original, and/or updated information is re-written into the addressed memory cells. READ and WRITE manipulations are performed on the information stored in the bit storage register.

The present invention utilizes the same four-phase operating sequence, but employs simplified circuitry which provides faster operation at lower power levels as well as improved stability.

SUMMARY OF THE INVENTION

A memory circuit employing variable threshold insulated gate field effect transistor memory cells operates in a four-phase sequence in response to signals applied from auxiliary decoder circuits in which a combination of clocked high power, and fixed low power transistors cooperate to provide a combination of rapid switching and high stability. Switching speed is further enhanced by including a similar combination of clocked and fixed low power transistors in conjunction with a flip-flop for temporarily storing binary information when the memory transistors are being preset and cleared.

DESCRIPTION OF THE PREFERRED EMBODIMENT

The memory system of the present invention utilizes the same four-phase operating sequence as the system described in co-pending patent application Ser. No. 380,782. In this operating sequence, the memory transistor is subjected to four combinations of operating voltages in sequence. During the first or "LOAD" phase, an intermediate negative voltage is applied to the gate electrodes of the memory transistors forming a row in a rectangular array. This permits the state of each member of the row to be read into a register common to the corresponding bit column of memory transistors. During the second or "preset" phase, a negative WRITE voltage is applied between the gate and substrate elements of the transistors in the same row. Thus, all memory transistors in that row are subjected to the most negative threshold voltage. This insures that each memory transistor never sees more than one positive WRITE pulse in succession and prevents an inadvertent accumulation of positive threshold voltage. Such an accumulation might turn on the memory transistor without its having been addressed.

In the third, or "clear" phase, all memory transistors in the selected row are subjected to the least negative or "inverted WRITE" voltage.

In the fourth, or "store" phase, the transistors representing selected bits of the cleared word are again switched into the more negative threshold state in accordance with the data stored in the register. During this fourth phase, either original or updated information can be written back into each memory transistor.

Figure 1:
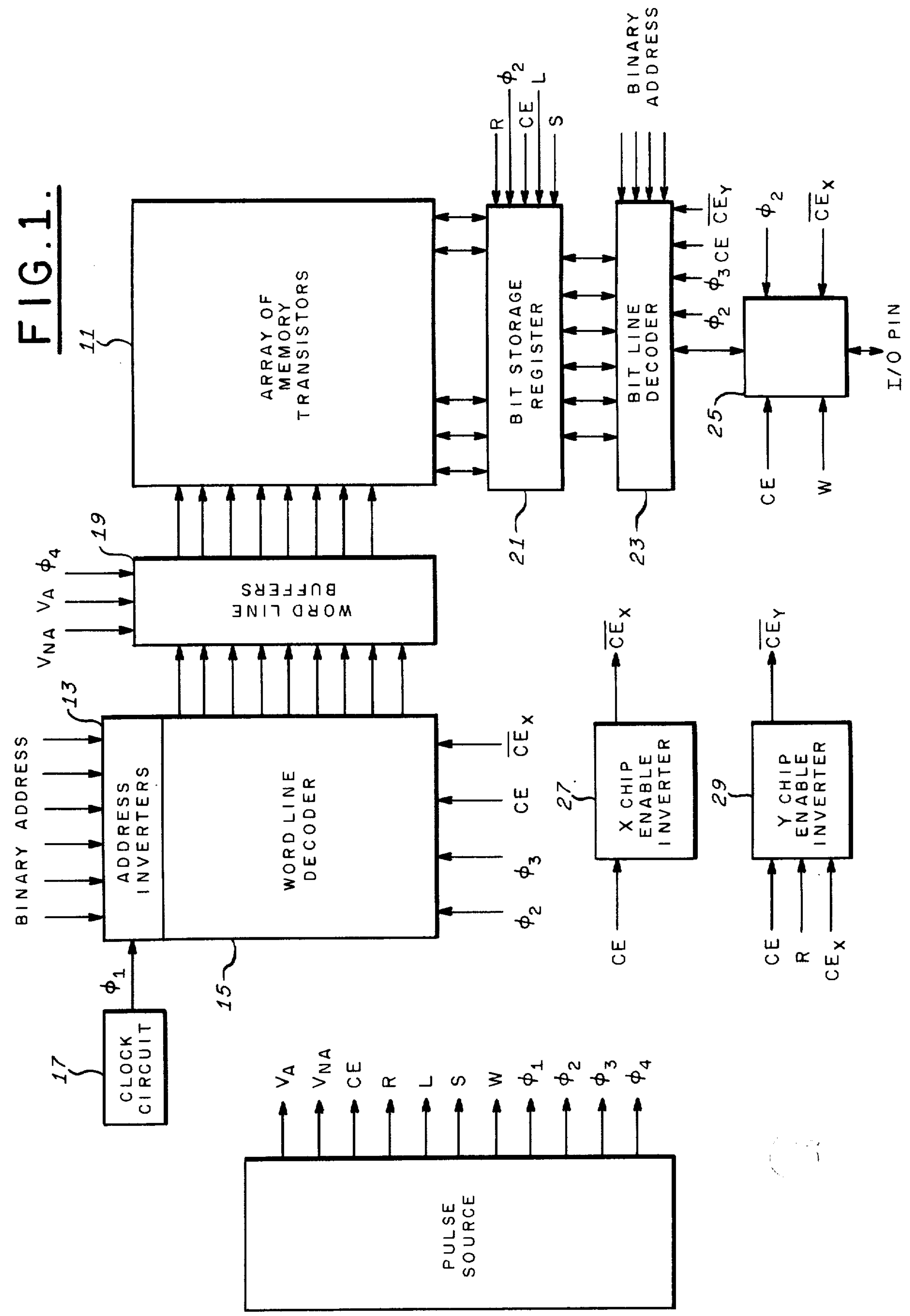
FIG. 1 is a block diagram of the memory system.

FIG. 1 is a block diagram of a typical memory system employing the principles of the invention. The memory itself includes an array 11 of variable threshold insulated gate field effect memory transistors. Typically, the array may contain 64 horizontal word rows and 32 vertical bit columns.

For an array of these proportions, a 6-bit binary address signal is applied to an inverter 13 which converts each addressed bit into a 2-rail signal suitable for operation in a word-line decoder 15. The inverter is operated in accordance with signals from a clock circuit 17.

A word-line buffer 19 performs a code inversion and translates the signals from the word-line decoder to a level required to operate the memory transistors.

Each of the bit columns in the memory array 11 is terminated by an individual bit register in the bit storage register 21. These individual bit registers are accessed sequentially by a bit-line decoder 23 in accordance with a 5-bit binary address signal applied to the decoder 23.

Information is written into or out of the bit storage register 21 through an input/output circuit 25.

The foregoing components are mounted on a single chip together with an X chip enable inverter 27 and a Y chip enable inverter 29.

Figure 2:
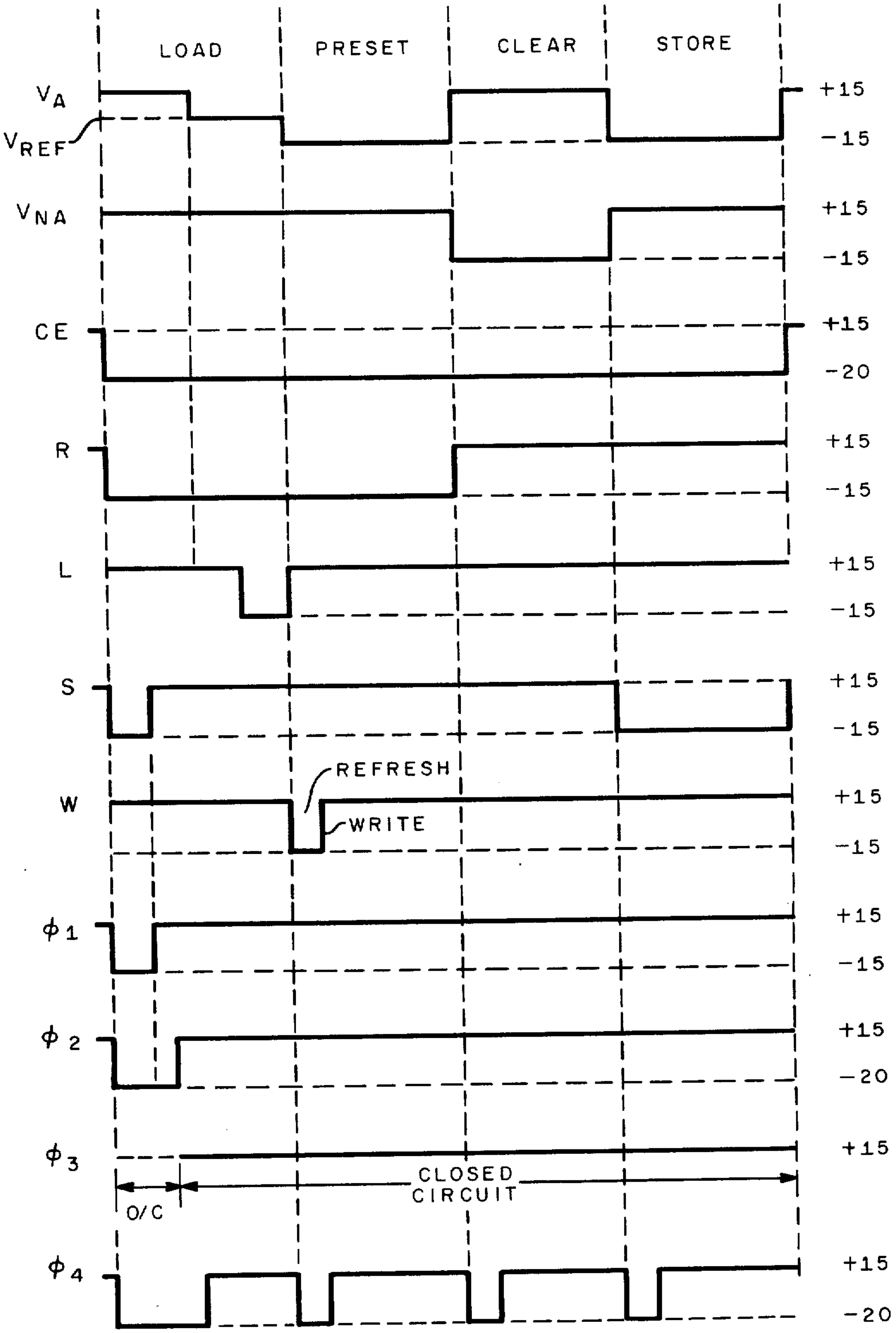
FIG. 2 is a timing diagram illustrating various voltages applied to the system during a single cycle of the four-phase operating sequence.
Figure 3:
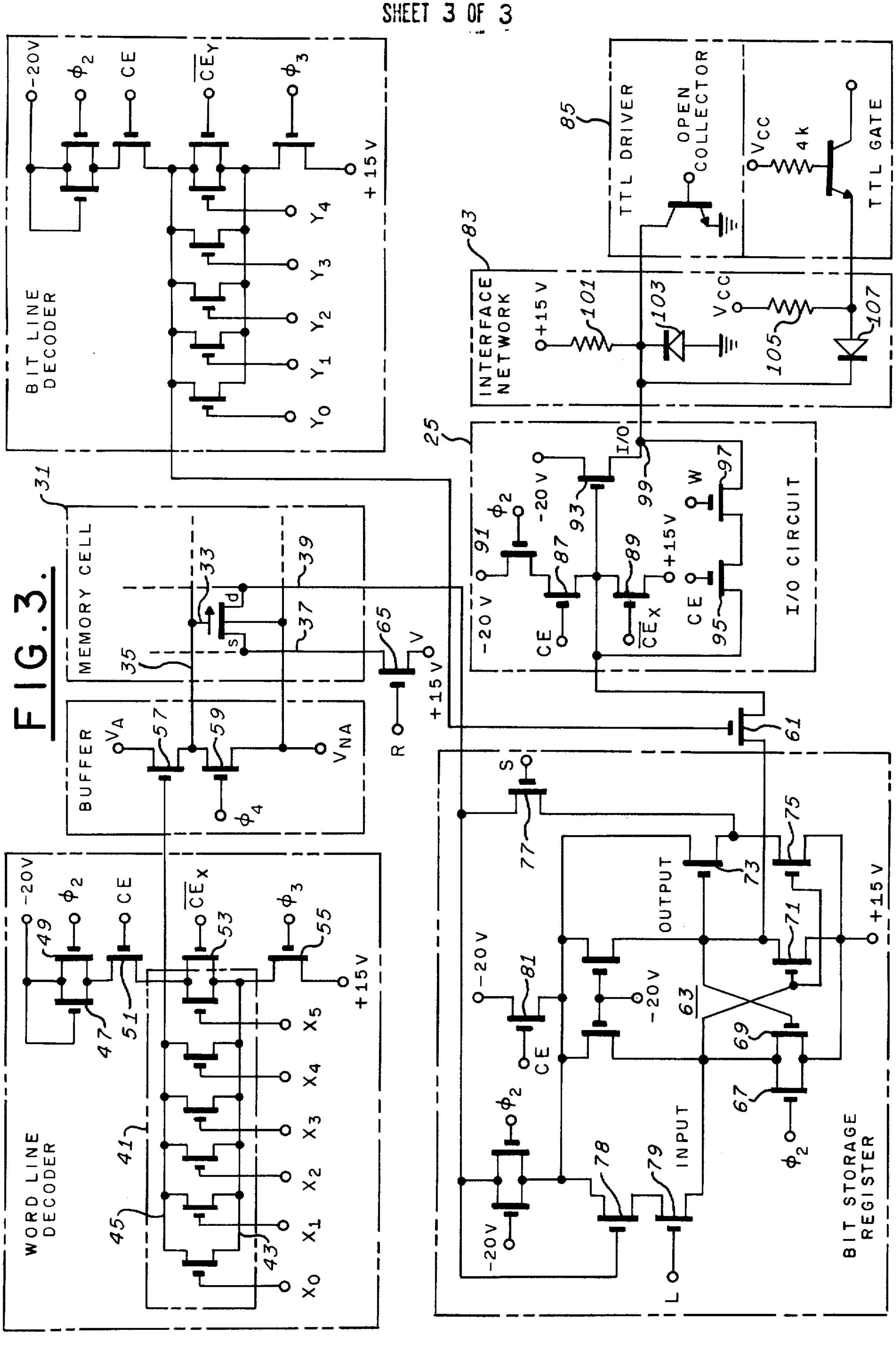
FIG. 3 is a simplified circuit diagram illustrating the construction of the memory system.

The actual memory chip will be operated with plus 15 volts $V_{SS}$ bias on the substrate for the fixed threshold transistor in the system and minus 20 volts $V_{DD}$. The use of these voltages permits address and data inputs to be TTL compatible (open collector with discretc resistors to +15 volts) and provides for a ten volt loss of dc. power level in the distribution and timing of the 25 volt write pulse levels required. The remaining input signals indicated in the block diagram of FIG. 1 are applied in a sequence as indicated in FIG. 2. The specific manner in which these signals are applied to the memory system may be understood by referring to the circuit diagram of FIG. 3 which illustrates the construction and inter-relationship of various components in the system. Since a practical memory circuit necessarily contains a large number of duplicate elements, FIG. 3 has been simplified by illustrating only a single variable threshold insulated gate field effect transistor memory cell 31 together with the necessary auxiliary circuits. It will be understood that the remaining transistors illustrated in the circuit of FIG. 3 are conventional fixed threshold devices. The memory transistor includes a gate electrode 33 connected to a word line 35 common to all memory transistors in that word row of the memory array. Similarly, the source electrode of the memory transistor in the memory cell 31 is connected to a common source line 37 which is, in turn, connected to the source electrodes of all of the memory transistors in the same bit column. A common drain line 39 is connected to the drain electrodes of all memory transistors in the same bit column.

The word-line decoder uses a conventional matrix with clocked address inverters to permit the use of single-rail binary inputs for two-rail decoding. As is known in the art, such address inverters may employ pairs of transistors in each line of the single-rail binary input for producing both the received signal and its complement. An illustrative circuit is shown, for instance, in U.S. Pat. app. Ser. No. 380,782. In response to a $\phi_1$ signal from the clock circuit 17 the address inverter provides both the true and complemented values of each bit in the received binary address signal.

The word-line decoder contains a multiple NOR gate such as the NOR gate 41, corresponding to each word row in the memory array. Each multiple NOR gate is arranged to receive a different combination of true and complemented signals and a given NOR gate is considered to be addressed when none of the individual transistors in that gate are turned on by the two-rail signal.

Thus the representative NOR gate 41 in the word-line decoder contains an individual transistor responsive to each of the two-rail address lines $X_0 - X_5$. The individual transistors are connected in parallel between first and second buses 43 and 45.

The bus 45 forms the decoder output line for the corresponding word row and is further coupled to the −20 volt $V_{DD}$ source through a preloading switching network including the dual loading transistors 47 and 49 and the enabling transistor 51. The transistor 47 is biased at a fixed low power level so as to provide a relatively high resistance static load. The loading transistor 49 is arranged to be driven into strong conduction by a $\phi_2$ precharging pulse so as to provide a clocked load of relatively low resistance value. The transistor 51 is turned on by a chip enable (CE) voltage when the particular circuits under consideration are to be actuated.

A NOR gate shorting transistor 53 is connected across the NOR gate 41 and serves to short out the gate 41 in response to a $\overline{CE}_X$ signal from the X chip enable inverter 27 (FIG. 1) when the particular circuits under consideration are not to be actuated.

The bus 43 is optionally coupled to the +15 volt $V_{SS}$ source through a transistor 55 in response to a $\phi_3$ discharge pulse. The use of the dual loading transistors 47 and 49 permits a significant increase in switching speed and at the same time contributes to dc. stability at high temperatures.

The decoder output line from the word-line decoder is coupled to the corresponding word line 35 in the memory array through the buffer circuit which prohibits spurious WRITE pulses which may be generated in the decoder from reaching the memory matrix.

The buffer contains a word-line coupling transistor 57 energized by the $V_A$ addressed gate voltage and switched in response to the decoder output signals, in series with a buffer shorting transistor 59 energized by the $V_{NA}$ substrate voltage and switched in accordance with a $\phi_4$ transient suppression voltage.

The word-line buffer acts as a high level source follower to the addressed word-line decoder during the load, preset and store phases of the operating sequence and as a high level inverter during the clear phase. The word-line buffer thus provides code inversion. As can be seen by referring to the curve of $\phi_4$ in FIG. 2, the buffer shorting transistor is driven into conduction by the $\phi_4$ suppression pulses during the transition between the various phases in the operating sequence. Thus the transistor 59 serves to insure that no false levels are coupled in non-addressed word lines during the transition between phases.

The operation of the word-line decoder and the buffer can be understood by referring to the graphs of FIG. 2 together with the circuit diagram of FIG. 3.

The circuits on a particular chip will be enabled by applying a CE voltage which will turn on all enabling transistors such as the transistor 51 and disable all NOR gate shorting transistors such as the transistor 53. During the first or "address" portion of the load sequence, a $\phi_2$ precharge pulse will be applied to the loading transistor 49 while the transistor 55 will remain open by virtue of the $\phi_3$ discharge gate voltage. This permits all decoder output lines in the particular word-line decoder to charge to a negative level regardless of whether or not a particular NOR gate is addressed. At the conclusion of the address portion of the load phase, the $\phi_2$ precharge pulse terminates and opens the loading transistor 49 and the $\phi_3$ discharge voltage turns on the transistor 55 so as to connect the bus 43 to a +15 volt source. If the particular NOR gate has not been addressed, one of the transistors in that gate will be conducting and the associated decoder output line will be discharged through the conducting transistor to the +15 volt level. In the case of the addressed NOR gate, however, none of the transistors in that gate will be conducting so that the corresponding decoder output line will remain at a negative level sufficient to turn on the word-line coupling transistor 57 to which it is connected. The decoder output lines remain at the voltage levels to which they have been switched for the remainder of the operating cycle.

During the address portion of the load phase, both the addressed gate voltage $V_A$, and the substrate voltage $V_{NA}$ are at a +15 volt level. Transistor 57 will be turned on by the voltage on the decoder output line and transistor 59 will be turned on by the $\phi_4$ suppression voltage. The word-line 35 will thus be maintained at the +15 volt level of the substrate.

During the second portion of the load phase, the voltage $V_A$ will be reduced to a reference level. The voltage $\phi_4$ will have terminated so that the transistor 59 will be non-conducting. Since a negative voltage remains on the decoder output line corresponding to the addressed NOR gate, the addressed word-line in the memory cell will be coupled to the $V_A$ voltage through the transistor 57. Since the non-addressed decoder output line will have been discharged, word lines in the non-addressed memory cell will be de-coupled from the voltage $V_A$.

The $V_A$ voltage during the second portion of the load phase drives the addressed word line to an intermediate reference level, whereas the substrate voltage, $V_{NA}$, remains at a positive level. This causes a voltage of READ magnitude to appear across the gate dielectric of the memory transistors in the addressed word row.

Furthermore, during the steady state portions of the remaining phases of the operating sequence, the addressed word line will be coupled to the $V_A$ voltage and the non-addressed word lines will be "floating." During the switching periods between phases, both addressed and non-addressed word lines will be coupled to the substrate by virtue of the $\phi_4$ transient suppression pulses.

The combination of the dual loading transistors associated with the NOR gate circuit and the transistor pair in the buffer circuit provides a means for actuating the word lines in the memory circuit which has several advantages over similar prior art circuits: The clocked plus static load technique implemented by means of the dual loading transistors, for instance, provides not only an increase in operating speed but also an increase in dc. stability. The use of the clocked plus static load technique, however, may introduce spurious WRITE pulse to the memory matrix but this difficulty is overcome by using the particular code inverting buffer circuit as described. Even though the non-addressed word lines are open-circuited, the flip-flop circuitry in the bit storage register (to be described) provides only positive-going transients on the common source and drain line. Thus any cross-talk will serve only to drive the floating non-addressed word line further "off" and no spurious READ levels will be encountered.

It should be noted that although both buffer transistors associated with the addressed word line will be conducting during the switching transients, the power dissipation will be small since only one of the 64 word lines will be energized. During the transient periods, the word line output will "jump" halfway to the final value and thus provide a substantial reduction in switching time. Furthermore, the addressed word line is resistively coupled through the word line coupling transistor to a reference voltage level during the read operation which occurs in the latter portion of the load phase. This provides for maximum discrimination between the high and low threshold extremes of the associated MNOS memory cell.

The bit-line decoder consists essentially of a multiple NOR gate similar to the NOR gate 41 described with reference to the word-line decoder. The bit-line decoder also utilizes the clocked plus static load technique described with reference to the word-line decoder. It will be appreciated that although only a single stage of bit line decoding is illustrated in FIG. 3, identical circuits would be provided for each column of memory transistors in a practical array.

The bit-line decoder differs from the word-line decoder in that code inversion is not required in the case of bit line decoding, so the NOR gate in the bit-line decoder can be coupled directly to an I/O select transistor intercoupling the I/O circuit and the bit storage register. Furthermore, the bit-line decoder utilizes a special chip enable input $\overline{CE}_Y$ which serves to decouple the I/O circuit from the flip-flop circuit in the addressed bit storage register after a WRITE input. The $\overline{CE}_Y$ pulse is derived from the Y chip enable inverter 29 (FIG. 1) in response to CE, R and $\overline{CE}_X$ voltages as indicates. The Y chip enable inverter provides a slight delay so that the $\overline{CE}_Y$ input, which serves to insure against spurious operation of non-enabled chips, cannot be released immediately upon chip enable and thus cause a premature discharge of the I/O circuit.

An individual stage of the bit storage register is coupled to each common drain line in the memory array. As depicted in FIG. 3, a representative stage of the bit storage register includes a store/restore flip-flop 63 together with the auxiliary switching circuitry. Access to the corresponding bit column is through the common drain line 39. The common source line 37 in the same bit column is optionally coupled to the +15 volt source through the source line transistor 65 in response to a READ (R) pulse.

During the address portion of the load phase, $\phi_2$ pulses are applied to the precharging transistors 65 and 67. This sets the flip-flop so that the first flip-flop transistor 69 is turned on whereas the second flip-flop transistor 71 is turned off. Under these conditions, a first output transistor 73 and a second output transistor 75 will be turned on and off respectively so that a negative voltage will be applied to a series transistor 77.

Since the $\phi_2$ pulses are applied to each stage in the bit storage register, each flip-flop in the entire register will be precharged to the set condition at the termination of the address portion of the load phase.

It will be noticed from the graph of FIG. 2, that a set (S) pulse occur during the $\phi_2$ pulse. This charges all common drain lines to a negative 15 volt level through the series transistor 77. Furthermore, since a negative read (R) voltage is applied to the source line transistor 65 at this time, all common source lines will be charged to a voltage of +15 volts.

Since the word lines in the memory array are clamped to the substrate at this time, no gate-substrate voltage is applied across the memory transistors during the address portion of the load phase.

At the conclusion of address portion of the load phase, $\phi_4$ will have terminated so that the addressed word line is coupled to the reference level of the voltage $V_A$ through the word line coupling transistor 57. The S pulse will have terminated by this time so that the series transistor 77 will have been turned off. The R pulse on the other hand, will still hold the source line transistor 65 in conduction so that the common source line will remain at the +15 volt level. Each memory transistor in the addressed word line will now conduct conditionally, depending upon the state of the individual threshold in that transistor. The conditional conduction process will then either discharge or leave as precharged, all the common drain lines in the matrix.

If a given memory transistor does not conduct, the negative charge stored on the common drain line 39 will remain and turn on a first input transistor 78. During the second portion of the load phase, a load (L) pulse will be applied to a second input transistor 79 so that the negative voltage from the drain line 39 will switch the flip-flop so as to drive the transistors 71 and 75 into conduction and the transistor 73 out of conduction.

In summary, a negative voltage will be applied to the series transistor 77 as well as the I/O select transistor 61 when the flip-flop is in the precharged or set condition. If the transistor is switched to the reset condition, a positive voltage will be applied to the series transistor 77 and the I/O select transistor 61.

The flip-flop will remain in the state which it occupied at the termination of the address portion of the load phase for the entire operating sequence unless fresh information is supplied from the circuit 25. During the store phase, an S pulse will again be applied to the series transistor 77 so that the voltage at the output of the flip-flop will be applied to the common drain line 39. The $V_A$ voltage applied to the addressed word line will be at a negative value whereas the substrate of the memory transistor will be at a positive value thereby providing a WRITE voltage across the transistor gate dielectrics and permitting information to be written back into the memory transistor.

It will be noted that the MNOS memory transistor operates as an inverter. This provides a minimum RC time constant in discharging the bit lines.

It will also be noted that the $V_A$ voltage is at a level which is identical for all addressed MNOS transistors in a system thus eliminating any threshold drops in address circuitry. For this reason no "on" drive need be sacrificed in overcoming threshold tolerances.

Similarly, the input side of the flip-flop need only be driven sufficiently negative to drive the output side of the flip-flop slightly more positive than the threshold value in order to start the transition of the flip-flop. The flip-flop then has a long time equal to the remainder of the load phase as well as the preset and clear phases to recover before the state of the flip-flop is interrogated during the store operation. For these reasons, the power dissipation can be kept to a minimum in the flip-flop.

Finally, it will be noticed that the input transistors 78 and 79 act as an attenuator in combination with an enabling transistor 81 to reduce and accurately set the least amount of discharge that is required to insure against false triggering throughout a system.

As a result of these features, the time required to assure that a conditional discharge of the common drain lines has not occurred on a given line can be very short, thus providing an extremely fast access time for the bit storage register.

The input-output circuit 25 is illustrated in conjunction with a typical interface network 83 that may be conveniently used in conjunction with functionally illustrated TTL circuits 85.

The input-output circuit utilizes enabling and disabling transistors 87 and 89 for actuating that circuit only during the time that the particular chip is operative. A precharging transistor 91 is turned on by a $\phi_2$ pulse during the address portion of the load phase so as to precharge an output transistor 93.

An input loop contains an enabling transistor 95 and a write transistor 97 connected between the input-output terminal 99 and the transistor 61 so as to bypass the precharging transistor and the output transistor when fresh information is to be written into the bit storage register during a write pulse.

Although any suitable interface circuit may be coupled to the input-output terminal, the memory circuit is particularly well suited for use with TTL circuits. For such applications, the interface network may contain a clamping circuit including a resistor 101 and a diode 103 together with a blocking circuit including a resistor 105 and a diode 107.

The input-output circuit also uses a precharge and conditional discharge technique for fast access. A $\phi_2$ pulse is applied to the precharging transistor 91 at the beginning of the address portion of the load phase so as to precharge the output transistor 93 in the conducting state. This drives the input-output pin 99 negative where it is clamped at the −0.6 volt level set by the diode 103. The diode 107 translates this voltage level to a zero voltage level at the input of a TTL gate in the enternal circuit so as to provide a logic "0" input to the input emitter.

If the addressed MNOS memory transistor in the associated bit column conducts, the drain line precharge will be dissipated, the flip-flop will not change state, and the output transistor 71 of the flip-flop will continue to provide a negative voltage to the gate electrode of the output transistor 93 so as to maintain the input-output pin 99 at a negative voltage level. Furthermore, the precharge will be sustained by the negative output level of the addressed flip-flop.

If the addressed MNOS memory transistor in the associated bit column does not conduct, however, the source line precharge will remain and the flip-flop will change state during the occurrence of the load (L) pulse When the flip-flop changes state, the precharge voltage on the gate electrode of the output transistor 93 will be dissipated. The current through this transistor will diminish, clamping diode 103 will cease conduction, and the voltage on the pin 99 will go positive towards +15 volts. As soon as the output voltage has gone to 1.2 volts, the TTL sensing gate will be switched. Since 1.2 volts is a small percentage of the total voltage swing, the sensing will be fast despite the relatively large time constant experienced in actual systems. After the output voltage exceeds +1.2 volts, diode 107 disconnects the TTL input, protecting it from the eventual +15 volt level.

When fresh information is to be written into the bit storage register, the output transistor 93 is bypassed by the application of a write (W) pulse to the gate electrode of the transistor 97 at the beginning of a preset phase.

The TTL compatible input-output circuit also utilizes a precharge and conditional discharge technique that provides high speed operation. Fast access is obtained by biasing and clamping techniques which in effect take a large slow MNOS voltage swing and convert it to a fast, low-level switching action at the sensing TTL gate input.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A digital memory system comprising an array of variable threshold insulated gate field effect memory transistors having source, drain and gate electrodes, said memory transistors being arranged in word rows and bit columns on a common substrate, said memory transistors being characterized in that they display a conduction threshold which may be shifted to a high level by the application of a WRITE voltage across the gate insulator of the transistor and to a low level by the application of an inverted WRITE voltage across the gate insulator, said transistors being further characterized in that information may be read out of said transistor by application of an intermediate-valued READ voltage across the gate insulator, pulse source means for applying sequential voltages to components in said system in a four-phase operating sequence consisting of load, reset, clear, and store phases, word-line and bit-line decoder means for addressing a selected memory transistor in said array, buffer means responsive to the output of said word-line decoder for applying suitable gate voltages to individual rows of memory transistors, bit storage register means including individual flip-flop means corresponding to each bit column for temporarily storing information read out of the addressed memory transistor in the associated column during said load phase and writing information back into addressed memory transistors during said store phase, input-output circuit means for coupling external circuits to individual flip-flops in said bit storage register in accordance with address signals from said bit line decoder, said buffer means including individual transistor pairs 2. The memory system of claim 1 wherein said word line decoder means includes a plurality of multiple NOR gates, each having a decoder output line for coupling address signals to a different one of said word line coupling transistors in the buffer means, each of said decoder output lines being further coupled through a preloaded switching network to a first source of dc. voltage suitable for turning on the associated word line coupling transistor and through a multiple NOR gate in series with a switching transistor to a second source of dc. voltage having a polarity opposite to that of said first dc. voltage, said preloaded switching network including a fixed high resistance transistor in parallel with a clocked low resistance transistor actuated by a precharge pulse from said pulse source occurring during the first portion of the load phase of an operating sequence, said switching transistor being actuated by a discharge pulse from said pulse source which maintains the switching transistor in a non-conducting state only during the occurrence of a precharge pulse, said bit line decoder means being arranged so that an address signal causes all multiple NOR gates except the addressed gate to conduct.

3. The system of claim 2 wherein said bit line decoder means further includes means for coupling each decoder output line to said first source of dc. voltage only when the circuits on the particular substrate are to be actuated and means for shorting out each multiple NOR gate whenever such circuits are not to be actuated.

4. The system of claim 3 wherein each of said flip-flops further contains a precharging transistor for setting said flip-flop to a predetermined state in response to a precharging pulse during a first portion of the load phase of said operating sequence, corresponding to each word line in the memory array, each transistor pair including a buffer shorting transistor arranged to clamp the gate electrodes of the memory transistors in the corresponding word row to the common substrate during transitions between operating phases, said transistor pair further including a word line coupling transistor for coupling gate signals supplied by said pulse source means to the gate electrodes of the selected row of memory transistors in response to an address voltage from said word line decoder, said pulse source means including means for producing gate and substrate voltages suitable for forming READ voltages during said load phase, WRITE voltages during said preset and store phases, and inverted WRITE voltages during said clear phase, said flip-flop means including transistor means in the input circuit thereof for coupling the input of the flip-flop to associated bit column in response to a load voltage pulse produced by said pulse source during said load phase, whereby information read out of the bit column in response to the concurrent READ voltage is entered into the associated flip-flop, said flip-flop means further including transistor means in the output circuit thereof for coupling the output of a flip-flop to the associated bit column in response to a store voltage pulse produced by said pulse source during said store phase, whereby information temporarily stored in said flip-flop is entered into the addressed transistor in said bit column in response to the concurrent WRITE voltage produced by said pulse source.

5. The system of claim 4 wherein each of said flip-flops is coupled to the common drain line of the corresponding bit column through a series transistor actuated by store pulses from said pulse source during the first portion of said load phase and during the store phase of the operating sequence, said series transistor being coupled to the output of said flip-flop so as to provide a voltage on the common drain line having a polarity indicative of the state of the flip-flop.

6. The system of claim 5 wherein each flip-flop is further coupled to the associated common drain line through first and second input transistors connected serially between a source of negative voltage and the input of said flip-flop, said first transistor being actuated in response to the charge on the associated common drain line, said second input transistor being actuated in response to a load pulse from said pulse source occurring during the latter portion of the load phase of the operating sequence.

7. The memory system of claim 6 wherein the common source line in each bit column is coupled to a source of positive voltage through a source line transistor actuated in response to a read voltage from said pulse source during the load and preset phases of the operating sequence.

8. The memory system of claim 7 wherein said input-output circuit is coupled to the output side of the corresponding flip-flop in the bit stage register through an input-output select transistor actuated in response to an address signal from the bit line decoder, said input-output select transistor being connected to the gate electrode of an output transistor in said input-output circuit, said transistor being connected between a source of negative voltage and an input-output terminal for reading information out of said system, said input-output circuit further containing a precharging transistor coupled between said source of negative voltage and the gate electrode of said output transistor, said precharging transistor being actuated by said precharging pulse so as to conditionally turn on said output transistor during the first portion of the load phase of the operating sequence, said input-output circuit further containing an input loop bypassing said precharging transistor and containing a series transistor actuated in response to a WRITE voltage from said pulse source so that information may be applied from an external circuit through the input loop to a selected flip-flop in said bit storage register.

9. A digital memory system comprising, an array of variable theshold insulated gate field effect memory transistors having source, drain and gate electrodes, said memory transistors being arranged in word rows and bit-columns on a common substrate, pulse source means for applying sequential voltages to components in said system in a four phase operating sequence consisting of load, reset, clear and store phases, word line decoder means for addressing a selected row of memory transistors, buffer means responsive to the output of said word line decoder means for providing predetermined gate voltages to the memory transistors in selected and non-selected word rows, said word line decoder means containing a plurality of decoder output lines, each corresponding to a different word row, each of said output lines being coupled to a source of negative voltage through a preloaded switching network and to a source of positive voltage through a multiple NOR gate in series with a switching transistor, said preloaded switching network containing static, high resistance coupling means shunted by clocked low resistance means, said clocked low resistance means and said switching transistor being arranged to be driven into and out of conduction respectively, during the duration of first and second pulses from said pulse source occurring during the first portion of said load phase so as to drive each of said decoder output lines negatively, said word line decoder means being arranged so that only the addressed multiple NOR gate remains non-conducting during an operating sequence whereby all non-address decoder output lines return to a positive voltage level after the termination of said first and second pulses, said buffer means including individual transistor pairs corresponding to each word row, each of said transistor pairs including a word line coupling transistor for coupling the associated word line to an addressed gate voltage from said clocked pulse source when the corresponding decoder output line is negative and a buffer shorting transistor arranged to clamp the associated word line to said common substrate during the transitions between phases in the operating sequence, bit storage register means having individual stages corresponding to each bit column in said memory array, each of said stages including a flip-flop response to information read out of the addressed memory transistor in the corresponding bit column during the load phase of said operating sequence, each of said stages further containing series transistor means for coupling information into the corresponding bit column indicative of the binary state of the flip-flop during the store phase of the operating cycle, individual input-output circuit means corresponding to each stage of said register means, and bit line decoder means for coupling a selected input-output circuit to the corresponding bit storage register stage.

* * * * *